(12) United States Patent
Boyer

(10) Patent No.: US 8,538,684 B2
(45) Date of Patent: Sep. 17, 2013

(54) GPS NAVIGATION

(75) Inventor: John M. Boyer, Victoria (CA)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 13/093,302

(22) Filed: Apr. 25, 2011

(65) Prior Publication Data

US 2012/0271543 A1 Oct. 25, 2012

(51) Int. Cl.
G01C 21/00 (2006.01)

(52) U.S. Cl.
USPC .......................................................... 701/416

(58) Field of Classification Search
USPC ......................... 701/412, 468, 532, 533, 416
See application file for complete search history.

(56) References Cited

U.S. PATENT DOCUMENTS

| 4,983,980 | A  | * | 1/1991  | Ando .................... 342/357.67 |
| 6,658,353 | B2 |   | 12/2003 | Shimizu et al. |
| 7,174,243 | B1 | * | 2/2007  | Lightner et al. ............ 701/32.4 |
| 7,603,233 | B2 |   | 10/2009 | Tashiro |
| 7,647,171 | B2 |   | 1/2010  | Horvitz et al. |
| 7,756,639 | B2 |   | 7/2010  | Colley et al. |
| 2001/0016489 | A1 | * | 8/2001 | Haymes et al. .............. 455/423 |
| 2009/0023456 | A1 | * | 1/2009 | Seacat et al. .............. 455/456.1 |
| 2009/0284348 | A1 | * | 11/2009 | Pfeffer ........................ 340/7.3 |
| 2010/0268459 | A1 |   | 10/2010 | O'Shea |

* cited by examiner

Primary Examiner — James Trammell
Assistant Examiner — Michael D Lang
(74) Attorney, Agent, or Firm — Cantor Colburn LLP; Ed Choi

(57) ABSTRACT

A method of GPS navigation includes receiving a request for a new route, determining the new route, removing known GPS signal-loss areas from the new route to create a loss-free route, and providing the loss-free route.

20 Claims, 9 Drawing Sheets

GPS NAVIGATION

BACKGROUND

This invention generally relates to global positioning systems (GPS), and more particularly, to methods of improved GPS navigation.

Conventionally, a stand-alone navigation device may be equipped with a GPS antenna such that the navigation device may provide a geographical location of the device to a user of the device. Such navigation devices may be used within transportation vehicles to provide position information associated with geographical location of the vehicles. However, in some circumstances, for example while located between several obstacles or large buildings, a geographic position may not be calculable due to signal loss associated with the obstacles. Thus, proper position information and therefore route navigation becomes uncertain for an end-user of the device.

BRIEF SUMMARY

According to an example embodiment of the present invention, a method of GPS navigation includes receiving a request for a new route, determining the new route, removing known GPS signal-loss areas from the new route to create a loss-free route, and providing the loss-free route.

According to an example embodiment of the present invention, a navigation device includes a processor configured to execute computer executable instructions that direct the processor to perform a method of GPS navigation. The method includes receiving a request for a new route, determining the new route, removing known GPS signal-loss areas from the new route to create a loss-free route, and providing the loss-free route.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
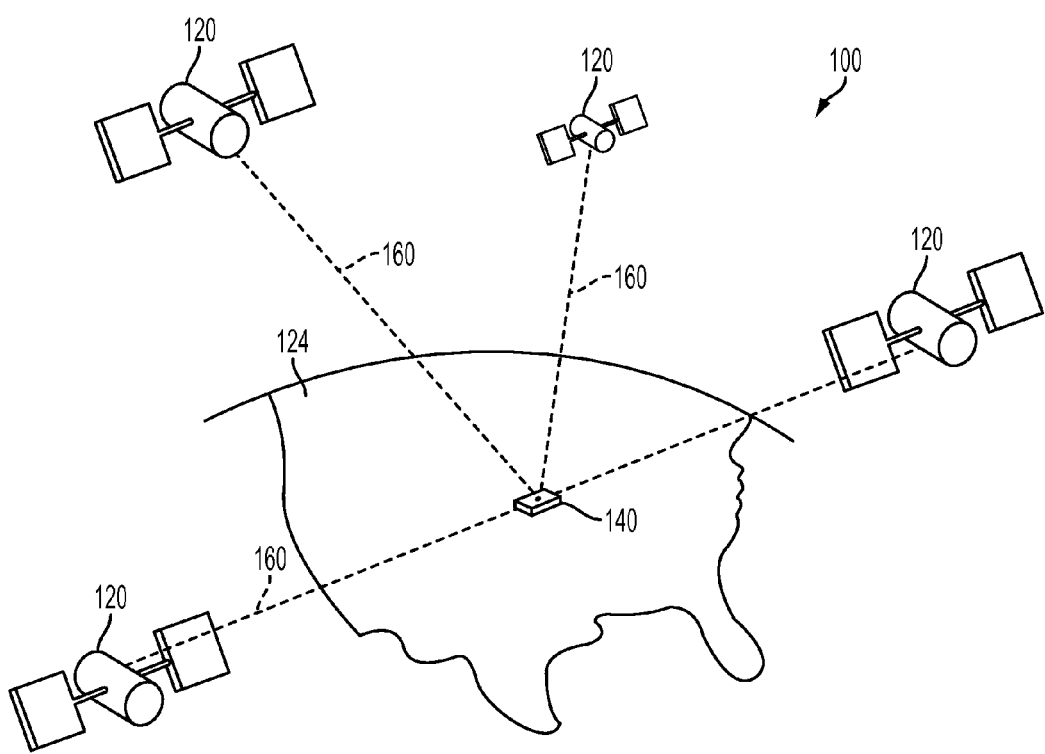
FIG. 1 illustrates an example view of a Global Positioning System (GPS)

The detailed description explains an exemplary embodiment, together with advantages and features, by way of example with reference to the drawings.

DETAILED DESCRIPTION

According to an exemplary embodiment, a solution has been achieved which significantly increases the reliability of GPS navigation systems. Technical effects and benefits include simplified route management and reduced possibility of loss of navigation capabilities.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Some portions of the detailed descriptions contained herein are presented in terms of algorithms, operations, function, and symbolic representations of operations within a computer device or navigation device. These algorithmic descriptions and representations will be apparent to those skilled in the art of computer processing and computer programming arts such that these descriptions may most effectively convey there aspects to those skilled in the art.

Furthermore, as used herein, a portable navigation device may include one more processing elements coupled with a computer readable memory which may be volatile or non-volatile or any combination thereof. The navigation device in example embodiments may be a handheld computing device which may be mounted or used in a personal vehicle for transportation. In some example embodiments, the navigation device is a combination of devices integrated into single portable electronic device. For example, the navigation device may include a typical GPS receiver, a palm top or personal digital assistant, a laptop, a mobile phone or cellular telephone, or any other device which may be integrated with the GPS device.

As used herein the phrase "navigation information," and/or "navigation specific information," refers to operations or functions related to navigation including guidance operations, route generate operations, mapping operations, geographic positioning operations, and similar operations which result in information pertaining to geographic location.

Referencing the drawings, wherein like reference numerals designate identical or corresponding parts throughout the several views, example embodiments of the present patent application are hereafter described.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, GPS incorporates a plurality of satellites which work with the earth in precise orbits. Based on these precise orbits, GPS satellites may relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by a substantially similar geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. It should be further appreciated that should spread spectrum signals not be acquired, the GPS device is plausibly located in a signal loss area or area with an obstacle blocking said spread spectrum signals, therefore reducing the possibility of an accurate position calculation.

Figure 2:
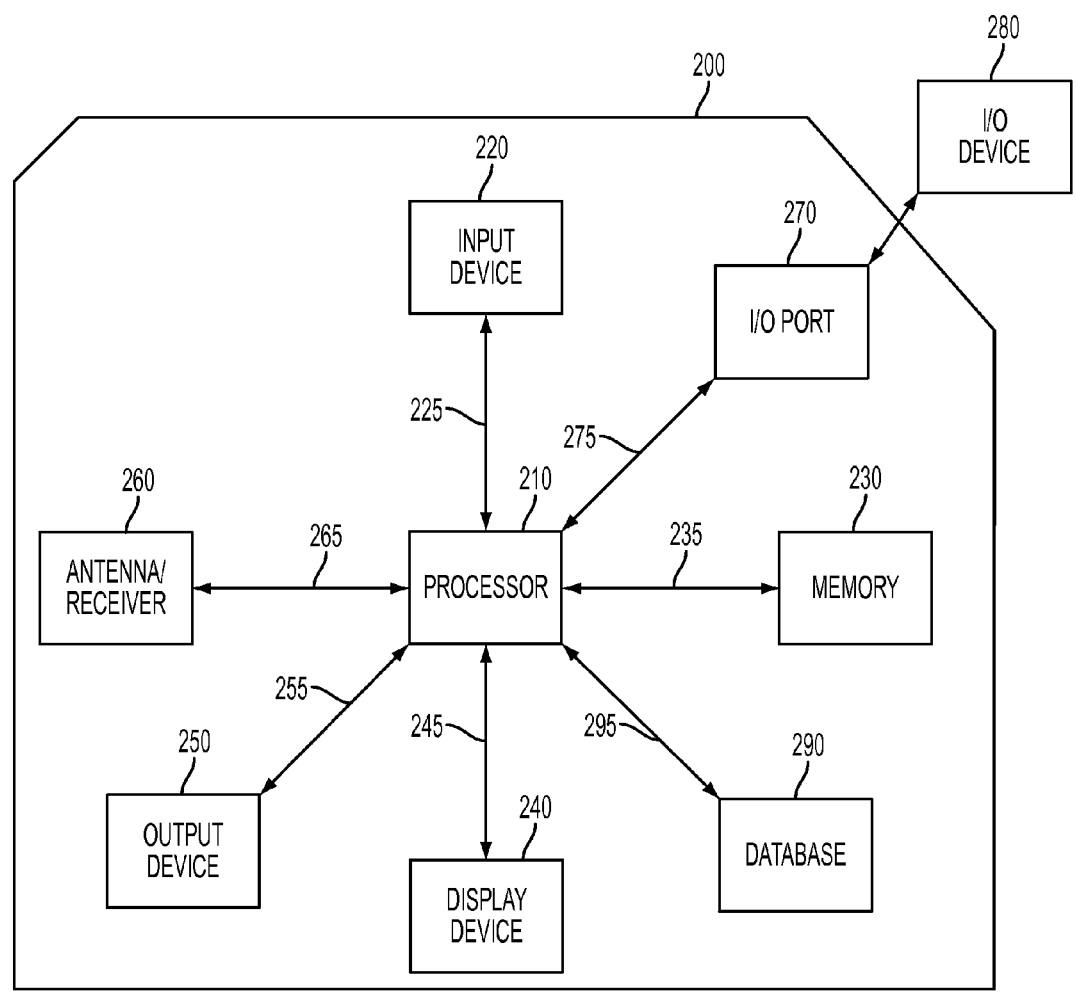
FIG. 2 illustrates an example block diagram of components of a navigation device, according to an example embodiment.

FIG. 2 illustrates an example block diagram of electronic components of a navigation device 200 of an example embodiment of the present application, in block component format. It should be noted that the block diagram of the navigation device 200 is not inclusive or exclusive of available components of the navigation device, but is only representative of conventional components.

The navigation device 200 is located within a housing (not shown). The housing includes a processor 210 connected to an input device 220 and a display screen 240. The input device 220 can include a keyboard device, voice input device, touch screen portion of the display 240, and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touch-screen input wherein a user need only touch a portion of the display screen 240 to select one of a plurality of display choices or to activate one of a plurality of virtual buttons.

In addition, output devices 250 may include an audible output device and/or other suitable output devices. As output device 250 can produce audible information to a user of the navigation device 200, it is equally understood that input device 240 can also include a microphone and software for receiving input voice commands as well.

In the navigation device 200, processor 210 is operatively connected to and configured to receive input information from input device 220 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device/network 280 external to the navigation device 200. The external I/O device 270 may include, but is not limited to an external listening device such as an earpiece for example. The connection to I/O device/network 280 can further be a wired or wireless connection to any other external device such as a car stereo unit for hands-free operation and/or for voice activated operation for example, for connection to an ear piece or head phones, and/or for connection to a mobile phone or wireless network for example, wherein this connection may be used to establish a data connection between the navigation device 200 and the internet or any other network such as a software as a service or cloud computing network for example, and/or to establish a connection to a server via the internet or some other network. The connection between said I/O port and external device/network may be embodied as a BLUETOOTH connection, a serial connection, cellular data connection (e.g., 3G/4G data connection), wired data connection, or any suitable connection for interfacing to an external device/network.

FIG. 2 further illustrates the processor 210 operatively connected to memory 230 through channel 235. Memory 230 may store a plurality of programs, applications, and/or a navigation application. The processor, using the applications from memory 230, may process the navigation application and other applications.

FIG. 2 further illustrates an operative connection between the processor 210 and database 290. For example, the database 290 may store information pertaining to settings on the navigation device, or other information including navigation maps and/or navigation specific information. The database 290 may be a long-term storage solution or non-volatile memory.

FIG. 2 further illustrates an operative connection between the processor 210 and an antenna/receiver 260 via connection 265, wherein the antenna/receiver 260 can be a GPS antenna/receiver for example. It will be understood that the antenna and receiver designated by reference numeral 260 are combined schematically for illustration, but that the antenna and receiver may be separately located components, and that the antenna may be a GPS patch antenna or helical antenna for example. Furthermore, the antenna/receiver 260 may include a plurality of antennas/receivers configured to communicate over a variety of mediums, for example to facilitate the data connections described above.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes any applicable navigation device 200.

In addition, the portable or handheld navigation device 200 of FIG. 2 can be connected and/or "docked" in a known manner to a motorized vehicle such as a car or boat for example. Such a navigation device 200 is then removable from the docked location for portable or handheld navigation use, for example, while walking or sitting. Further, the navigation device 200 may be embodied as a mobile phone or portable laptop computer equally mobile and available to transport in a motorized vehicle or amongst a person.

Figure 3:
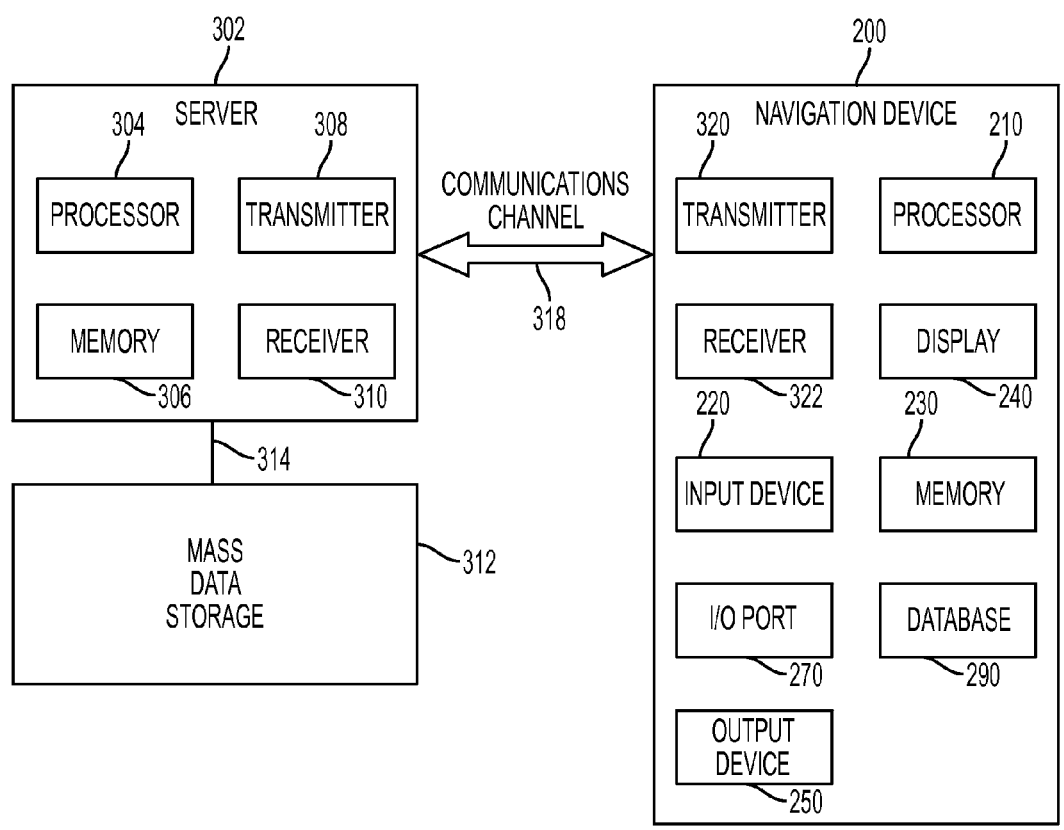
FIG. 3 illustrates an example block diagram of a server, navigation device and connection there-between, according to an example embodiment.

FIG. 3 illustrates an example block diagram of a server 302 and a navigation device 200 of the present application, via a generic communications channel 318, of an example embodiment of the present application. The server 302 and navigation device 200 of the present application can communicate when a connection via communications channel 318 is established between the server 302 and the navigation device 200 (noting that such a connection can be a data connection via mobile device, a direct connection via personal computer via the internet, wireless data connection through an additional antenna located in the device, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology.

The mass data storage 312 includes sufficient memory for the desired navigation applications. Examples of the mass data storage 312 may include magnetic data storage media such as hard drives for example, optical storage media such as CD-ROMs for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an Internet connection between the server 302 and the navigation device 200. Alternatively, a mobile telephone or other handheld device may establish a wireless connection to the Internet, for connecting the navigation device 200 to the server 302 via the Internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and data connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

Furthermore, although illustrated and described as a server, it should be understood that the same may be replaced with a distributed computing environment, cloud computing environment, and/or any applicable software as a service provisioning environment.

Figure 4:
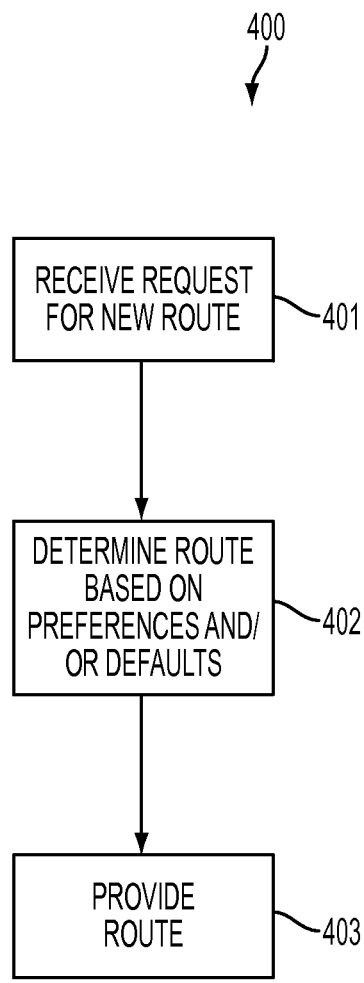
FIG. 4 illustrates a method of providing GPS navigation.

Turning to FIG. 4, a method of providing GPS navigation is illustrated. The method 400 includes receiving a request for a new route at block 401. The request may include at least a destination, or alternatively a destination and desired starting point. The method 400 further includes determining the new route based on preferences and/or defaults of a navigation device at block 402. The determining may be facilitated through logical traversal of navigation maps or information stored at a navigation device or at a server/computing environment to determine a traversable route through said navigation maps. The method 400 further includes providing the new route at block 403. The providing may include, for example, transmitting the route to a navigation device or, if calculated at a navigation device, audibly providing the route information or displaying the information.

Figure 5:
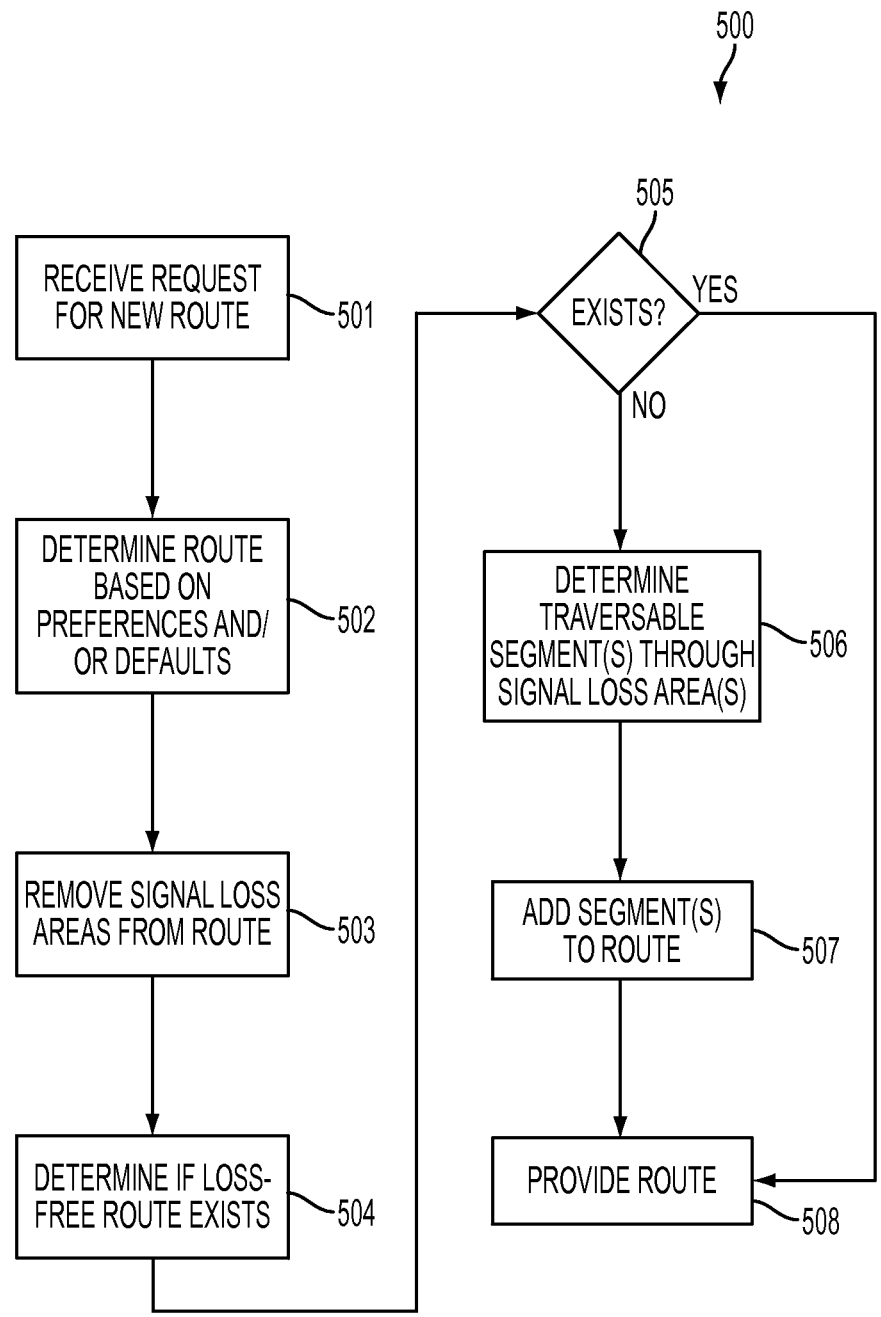
FIG. 5 illustrates an improved method of providing GPS navigation, according to an example embodiment.

Turning to FIG. 5, an improved method of providing GPS navigation is illustrated. The method 500 includes receiving a request for a new route at block 501. The request may include at least a destination, or alternatively a destination and desired starting point. For example, in the event a navigation device is in a signal loss area, a geographical location of the navigation device may not be computable, therefore a starting point may be included in the request. The method 500 further includes determining the new route based on preferences and/or defaults of a navigation device at block 502. The determining may be facilitated through logical traversal of navigation maps or information stored at a navigation device or at a server/computing environment to determine a traversable route through said navigation maps.

Figure 6:
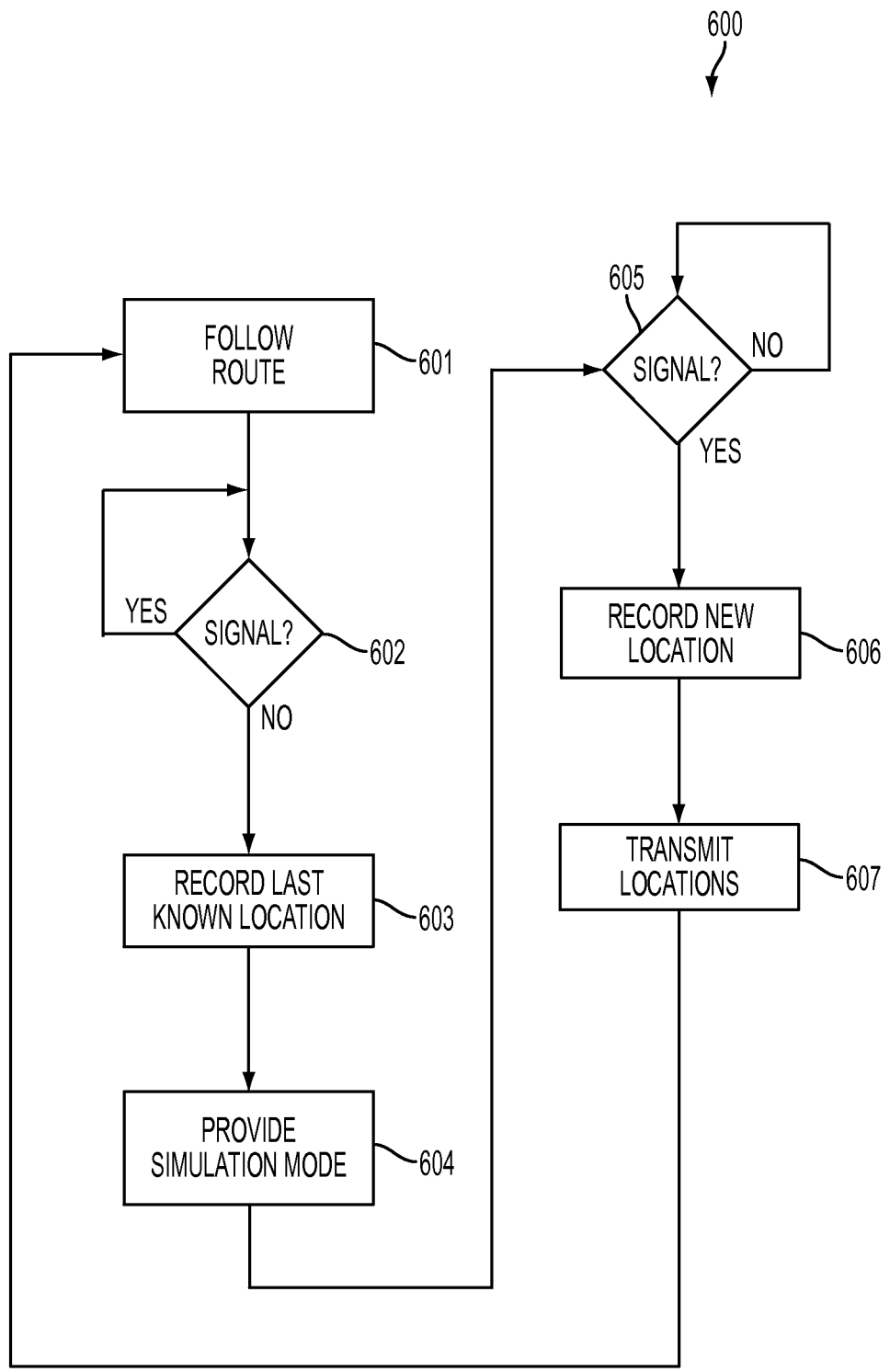
FIG. 6 illustrates a method of tracking signal loss areas, according to an example embodiment.

The method 500 further includes removing known signal loss areas from the new route at block 503. The known signal loss area may be geographic areas known to have inadequate or minimal spread spectrum signals, therefore reducing the possibility of a good GPS location calculation by a navigation device. The known signal loss areas may be logically determined through consideration of known obstacles, monuments, buildings, etc., or may be crowd-sourced from a plurality of different users/navigation devices as illustrated in FIG. 6. Additionally, a route segment may also be determined to be a signal loss segment based on a partial or full overlap of a route segment with a known segment of signal loss data, rather than just an exact match. For example, if any of the logical determinations noted above return a segment which overlaps a route segment (e.g., Main ST overlapping an intersection within the route), this route segment may be considered within a signal loss area. Thus, block 503 should be construed as including any such considerations for removal of signal loss areas.

Turning back to FIG. 5, the method 500 further includes determining if a loss-free route exists given the removal of signal loss areas, and the remaining portions of the map available at block 504. For example, upon removal of the signal loss areas, the new route may still exist, or may include absent segments. Thus, block 504 may include attempts to populate the absent segments while avoiding the signal loss areas. For example, through each segment removed due to being within a known signal loss area, the start and end of the segment are taken as a routing request processed with a map in which the roadways/segments through the signal loss area are removed. Additionally, more than one consecutive segment of the route may be determined to be a signal loss segment, whereupon the signal loss segment start and end locations for removal are the start of the first segment and the end of the last segment of the sequence of signal loss segments. It should also be noted that as there may be a finite number of traversable routes available and the available traversable routes may violate other user constraints, such as computing a route that is no more than twice as long as a route containing signal loss areas. Thus, block 504 should be construed as including or taking into consideration all such scenarios. Additionally, the determining may be accomplished through a plurality of different algorithmic approaches and thus exhaustive description is omitted herein for the sake of brevity.

As further illustrated, if a loss free route exists, the new route is provided as described above at block 508. Alternatively, if a loss-free route does not exist, a traversable segment (s) of the signal loss area(s) is determined at block 506. The traversable route may be a shortest-distance route or a fastest route available which populates the noted absent segments. However, it should be noted that simply maintaining a default or lossy route is also applicable in some cases. Upon determining the traversable segment(s), the segment(s) is added to the route at block 507, and the new route is provided at block 508.

As noted above, signal loss area may be crowd sourced and/or calculated at a navigation device. A method 400 of tracking signal loss areas is illustrated in FIG. 6

As illustrated, the method 600 includes following a route at block 601. Following the route may include conventional processing, for example, as is known in the art. Such includes monitoring the geographical position of a navigation device and providing feedback as to the state of the device compared to the established or desired route. Further, new-route computations and other computations may be performed in parallel to block 601.

The method 600 further includes determining if a GPS signal has been lost at block 602. If the signal has been lost, the method 600 includes recording the last known location of a navigation device at block 603. Thereafter, a simulation mode may be provided at block 604. A simulation mode may include providing next-turn or simulated guidance at a navigation device. The simulation mode may receive prompts at the navigation device, for example, from a navigation device user indicating when portions of a route have been successfully completed. Such simulations modes may be based on conventional methodologies, or may include features of signal loss tracking, for example, by displaying known signal loss areas to a user. The displaying may include providing a map around the last known location and markings or other indications of known signal loss areas.

The method 600 further includes determining if a signal has been acquired at block 605. If a signal has been acquired, the method includes recording a navigation device's new geographic location at block 606.

The method 600 further includes transmitting the last-known location before signal loss and new geographic location at block 607. These locations may be transmitted via a data connection in any form as described in detail above. Thus, if the navigation device includes a working data connection, the locations may be transmitted immediately or in parallel with the other operations of the method 600. Alternatively, if the navigation device does not have a working data connection or if user defaults/settings establish otherwise, the locations may be transmitted upon initiation of a working connection while still continuing to implement the other operations of the method 600 and/or or upon synching the navigation device with a personal computer or other computing device. Thus, it should be appreciated that while illustrated as an operation occurring sequentially during route traversal, block 607 should be interpreted as transmission of location information as best suited to any desired implementation, or based upon any particular capabilities, of a navigation device.

It should be appreciated that as any available navigation device may track signal loss areas, a plurality of known signal loss locations may be crowd sourced and considered at a signal-loss information server or distributed computing/cloud computing environment before providing route information or new navigation specific information to other navigation devices. Furthermore, a single navigation device may transmit this information at a personal computer, thus enabling a personal account of signal loss areas particular to a specific navigation device.

It is noted that although described as separate, the methods 500 and 600 are combinable such that the route followed at block 601 includes signal loss tracking and appropriately updating known signal-loss areas.

Figure 7:
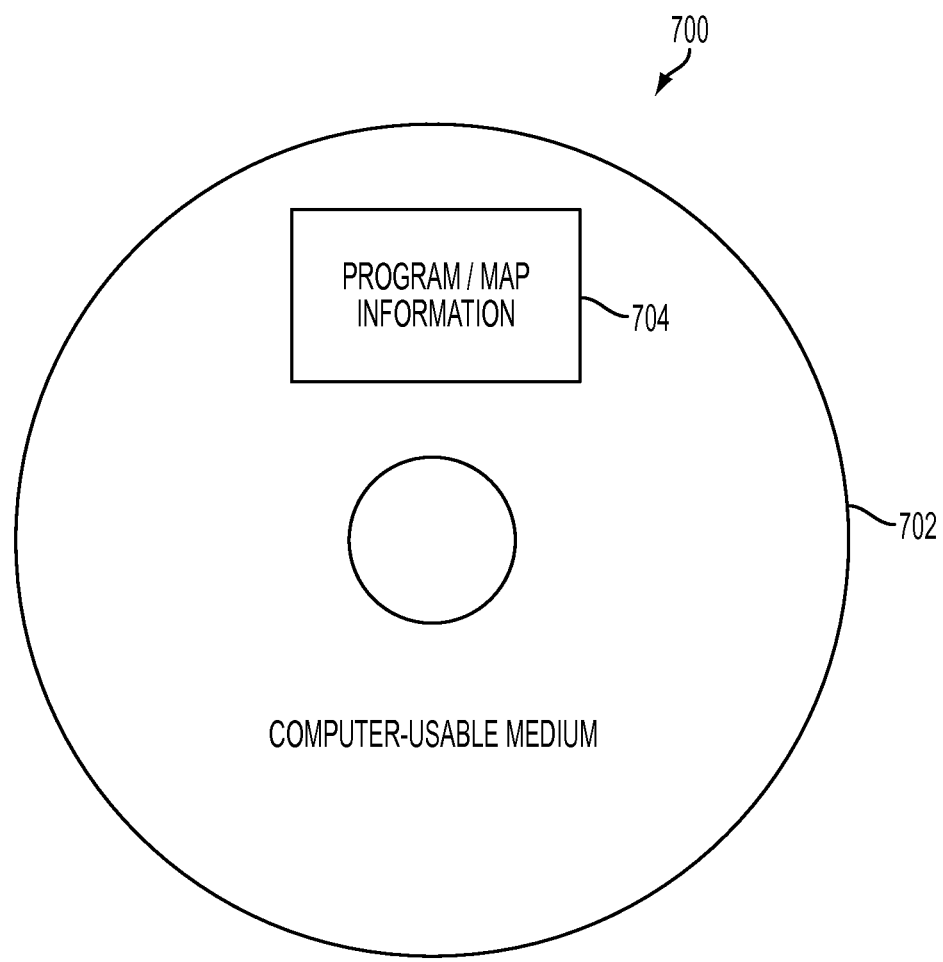
FIG. 7 illustrates a computer program product, according to an example embodiment.

Furthermore, as illustrated in FIG. 7, map processing protocols, programs, and/or map and navigation information 704 may be provided as a computer program product 700 embodied on a computer readable storage medium 702. The programs may include any of the methodologies described above in addition to any other desirable methods, and may be deployed at a standalone navigation device, a personal computer, a server, or any suitable computing device.

As described above, a navigation device may process route information on its own, or may be provided information through a remote server or external processing means, with such processing being facilitated by computer executable instructions deployed via a computer program product or via a data connection. However, it should be understood that any available processing means may be applicable to example embodiments, including cloud computing services. It is understood that although this disclosure includes the following detailed description on cloud computing, implementation of the teachings recited herein are not limited to a cloud computing environment. Rather, example embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include software as a service, platform as a service, and infrastructure as a service models as described below.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud computing environment is service oriented with a focus on statelessness, low coupling, modularity, and semantic interoperability. At the heart of cloud computing is an infrastructure comprising a network of interconnected nodes.

Figure 8:
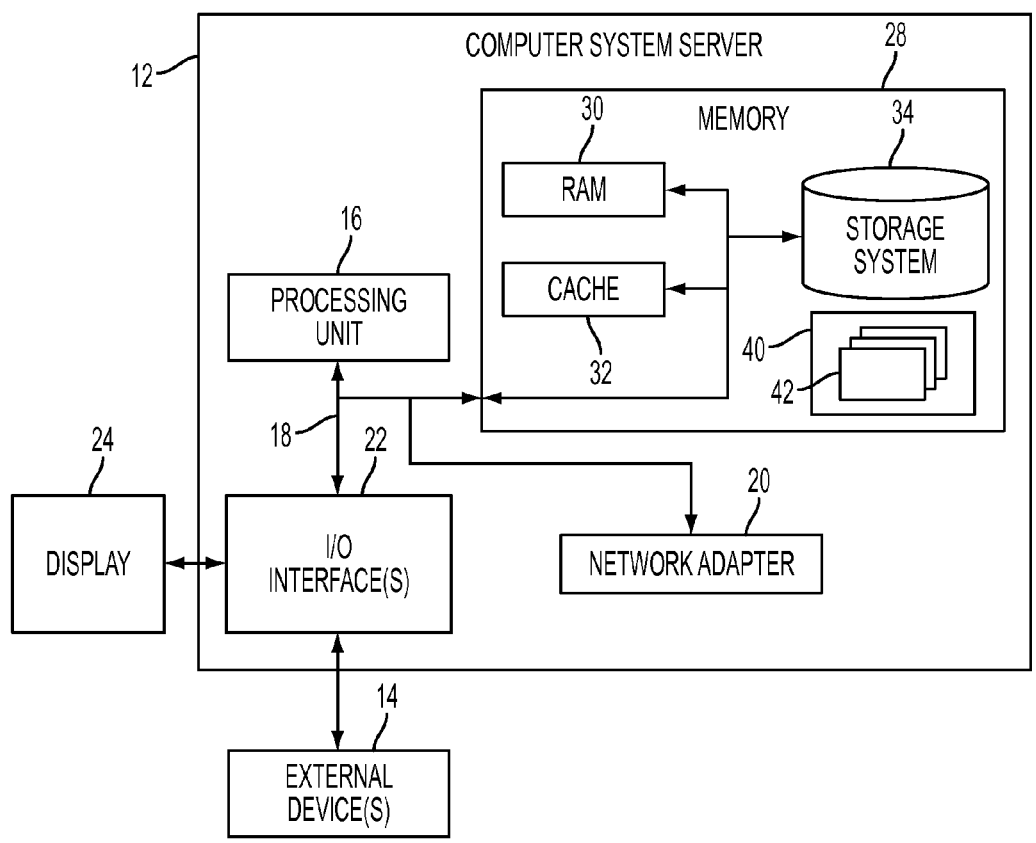
FIG. 8 illustrates a schematic of an example of a cloud computing node, according to an example embodiment.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
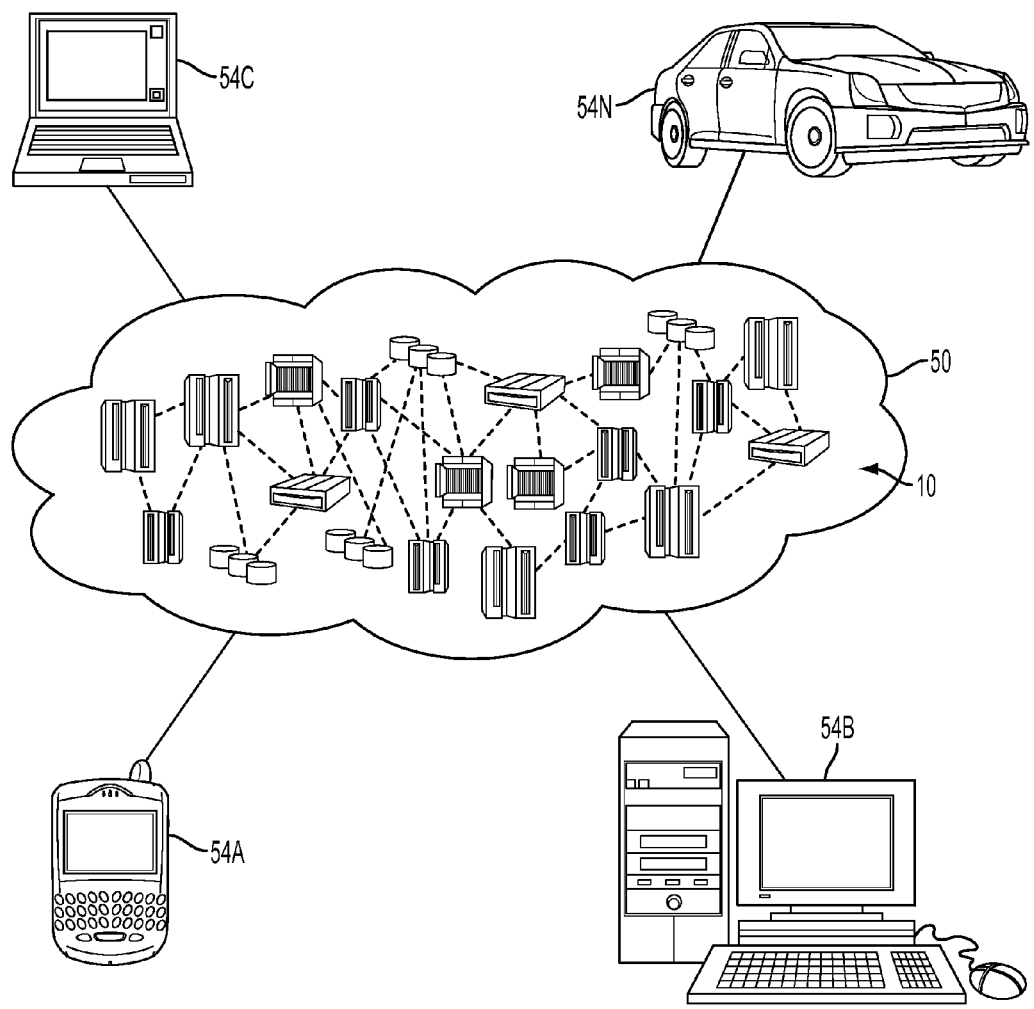
FIG. 9 illustrates a cloud computing node, according to an example embodiment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device, for example, navigation specific services. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

While example embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method of GPS navigation, comprising:
    receiving, by a processing device, a request for a new route;
    determining the new route;
    removing, via a hardware processor, known GPS signal-loss areas from the new route to create a loss-free route; and
    providing the loss-free route.

2. The method of claim 1, further comprising determining whether the loss-free route is traversable, and responsive to determining the loss-free route is not traversable, adding a traversable segment of at least one of the known signal-loss areas to the loss-free route.

3. The method of claim 1, wherein:
    receiving the request includes receiving a desired geographic destination; and
    determining the new route includes determining a route from a current geographic location of a navigation device to the desired geographic destination or determining a route from a default starting geographic location to the desired geographic destination.

4. The method of claim 1 wherein removing known GPS signal-loss areas from the new route includes retrieving signal loss information, and removing segments of the new route associated with the signal loss information.

5. The method of claim 4, further comprising replacing the removed segments with new segments outside at least one boundary of the known signal-loss areas to create the loss free route.

6. The method of claim 4, further comprising replacing the removed segments with new segments within at least one boundary of the known signal-loss areas if no appropriate segments exist outside the at least one boundary of the known signal-loss areas.

7. The method of claim 4, further comprising:
    determining whether a traversable route exists outside at least one boundary of the known signal-loss areas which is of a length less than a predetermined threshold length, and responsive to determining that a traversable route does not exist, replacing the removed segments with new segments within at least one boundary of the known signal-loss areas to reduce a length of the loss-free route.

8. The method of claim 1, further comprising determining whether a GPS signal has been lost by a navigation device, and responsive to determining the GPS signal has been lost, recording a last known geographic location of the navigation device.

9. The method of claim 8, wherein if the GPS signal has been lost, providing a simulated navigation mode at the navigation device.

10. The method of claim 8, further comprising, responsive to determining the GPS signal has been lost and subsequently regained, recording a new geographic location of the navigation device.

11. The method of claim 10, further comprising transmitting the last known geographic location of the navigation device and the new geographic location of the navigation device to a signal-loss area database configured to provide signal-loss information to navigation devices.

12. The method of claim 1, wherein the determining, removing, and providing is provided as a service by a software-as-a-service capable environment.

13. A navigation device, comprising a processor configured to execute computer executable instructions that direct the processor to perform a method of GPS navigation, the method comprising:
   receiving a request for a new route;
   determining the new route;
   removing known GPS signal-loss areas from the new route to create a loss-free route; and
   providing the loss-free route.

14. The device of claim 13 wherein removing known GPS signal-loss areas from the new route includes retrieving signal loss information, and removing segments of the new route associated with the signal loss information.

15. The device of claim 14, wherein the method further comprises replacing the removed segments with new segments outside at least one boundary of the known signal-loss areas to create the loss free route.

16. The device of claim 14, wherein the method further comprises replacing the removed segments with new segments within at least one boundary of the known signal-loss areas if no appropriate segments exist outside the at least one boundary of the known signal-loss areas.

17. The device of claim 13, wherein the method further comprises determining whether a GPS signal has been lost by the navigation device, and responsive to determining the GPS signal has been lost, recording a last known geographic location of the navigation device.

18. The device of claim 17, wherein if the GPS signal has been lost, the method further comprises providing a simulated navigation mode at the navigation device.

19. The device of claim 17, wherein the method further comprises, responsive to determining the GPS signal has been lost and subsequently regained, recording a new geographic location of the navigation device.

20. The device of claim 19, wherein the method further comprises transmitting the last known geographic location of the navigation device and the new geographic location of the navigation device to a signal-loss information database configured to provide signal-loss information to navigation devices.

* * * * *